United States Patent
Minami

(10) Patent No.: US 11,489,196 B2
(45) Date of Patent: *Nov. 1, 2022

(54) SULFIDE SOLID ELECTROLYTE PARTICLES, METHOD FOR PRODUCING THE SAME, AND ALL-SOLID-STATE BATTERY

(71) Applicant: TOYOTA JIDOSHA KABUSHIKI KAISHA, Toyota (JP)

(72) Inventor: Keiichi Minami, Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 222 days.

This patent is subject to a terminal disclaimer.

(21) Appl. No.: 16/743,204

(22) Filed: Jan. 15, 2020

(65) Prior Publication Data
US 2020/0235423 A1 Jul. 23, 2020

(30) Foreign Application Priority Data
Jan. 17, 2019 (JP) .............................. JP2019-006298

(51) Int. Cl.
*H01M 10/0562* (2010.01)
*H01M 10/0525* (2010.01)
(Continued)

(52) U.S. Cl.
CPC ..... *H01M 10/0562* (2013.01); *H01M 4/5815* (2013.01); *H01M 4/621* (2013.01);
(Continued)

(58) Field of Classification Search
CPC ......... H01M 10/0562; H01M 10/0525; H01M 4/5815; H01M 4/621
See application file for complete search history.

(56) References Cited

U.S. PATENT DOCUMENTS

2016/0149259 A1   5/2016   Osada et al.
2016/0156064 A1   6/2016   Miyashita et al.
(Continued)

FOREIGN PATENT DOCUMENTS

JP   2012-094445 A   5/2012
JP   2015-11901 A    1/2015
(Continued)

OTHER PUBLICATIONS

Non-Final Office Action dated Feb. 18, 2022 issued in U.S. Appl. No. 16/743,061.
(Continued)

*Primary Examiner* — Matthew J Merkling
(74) *Attorney, Agent, or Firm* — Sughrue Mion, PLLC

(57) ABSTRACT

Provided are sulfide solid electrolyte particles which have sufficient ion conductivity and which are configured to suppress hydrogen sulfide generation, and an all-solid-state battery comprising the sulfide solid electrolyte particles. Disclosed are sulfide solid electrolyte particles comprising Li, P, S and a halogen as constituent elements and having a Li/P molar ratio of more than 3, wherein an oxygen/sulfur element ratio of a particle surface measured by XPS is 0.29 or more and 0.81 and less, and an oxygen/sulfur element ratio at a depth of 30 nm (in terms of a $SiO_2$ sputter rate) from the particle surface measured by XPS, is 0.29 or less.

5 Claims, 1 Drawing Sheet

(51) Int. Cl.
*H01M 4/58* (2010.01)
*H01M 4/62* (2006.01)

(52) U.S. Cl.
CPC ............. *H01M 10/0525* (2013.01); *H01M 2300/0068* (2013.01); *H01M 2300/0091* (2013.01)

(56) References Cited

U.S. PATENT DOCUMENTS

| | | | |
|---|---|---|---|
| 2017/0331149 A1* | 11/2017 | Sasaki | H01M 4/661 |
| 2018/0062166 A1* | 3/2018 | Sasaki | H01M 4/485 |
| 2018/0138545 A1 | 5/2018 | Aburatani et al. | |
| 2018/0175447 A1* | 6/2018 | Kanno | C01B 33/32 |
| 2019/0081352 A1* | 3/2019 | Sasaki | H01M 4/366 |
| 2020/0091552 A1 | 3/2020 | Terai et al. | |
| 2020/0130041 A1 | 4/2020 | Iiduka | |
| 2020/0235422 A1* | 7/2020 | Minami | H01M 4/5815 |
| 2021/0013542 A1 | 1/2021 | Takahashi et al. | |

FOREIGN PATENT DOCUMENTS

| | | |
|---|---|---|
| JP | 2017-054720 A | 3/2017 |
| JP | 2018-026321 A | 2/2018 |
| WO | 2015/012042 A1 | 1/2015 |
| WO | 2016/167302 A1 | 10/2016 |
| WO | 2018/216730 A1 | 11/2018 |
| WO | 2019/003333 A1 | 1/2019 |
| WO | 2019/176895 A1 | 9/2019 |

OTHER PUBLICATIONS

Notice of Allowance dated Aug 30, 2022 in U.S. Appl. No. 16/743,061.

* cited by examiner

SULFIDE SOLID ELECTROLYTE PARTICLES, METHOD FOR PRODUCING THE SAME, AND ALL-SOLID-STATE BATTERY

TECHNICAL FIELD

The disclosure relates to sulfide solid electrolyte particles, method for producing the same, and an all-solid-state battery.

BACKGROUND

An all-solid-state battery such as an all-solid-state lithium secondary battery in which a solid electrolyte is used in place of a liquid electrolyte, does not use a combustible organic solvent inside the battery. Accordingly, such an all-solid-state battery is considered to be able to realize a simplified safety device and excellent in production cost and productivity.

The components of such an all-solid-state battery, that is, the cathode, the anode and the electrolytes of the battery, are all solid. Accordingly, the all-solid-state battery has a tendency to have large electrical resistance and provide small output current compared to, for example, a lithium secondary battery comprising an organic liquid electrolyte.

To increase the output current of the all-solid-state lithium secondary battery, therefore, an electrolyte with high ion conductivity may be used. A sulfide solid electrolyte is considered to show higher ion conductivity than an oxide solid electrolyte, since a sulfide ion has large polarizability compared to an oxide ion, and an electrostatic attraction force between a sulfide ion and a lithium ion is small.

Patent Literature 1 discloses a sulfide solid electrolyte material which comprises a sulfide layer containing a sulfide material and an oxide layer containing an oxide formed by the oxidation of the sulfide material, wherein the oxide layer is located on a surface of the sulfide layer, and the sulfide solid electrolyte material satisfies $1.28 \leq x \leq 4.06$ and $x/y \geq 2.60$, where "x" is the oxygen/sulfur element ratio of the outermost surface of the oxide layer, which is measured by XPS depth profile analysis, and "y" is the oxygen/sulfur element ratio at a depth of 32 nm (in terms of a $SiO_2$ sputtering rate) from the outermost surface of the oxide layer, which is measured by XPS depth profile analysis. Patent Literature 1 states as follows: by sufficiently increasing the ratio of oxygen binding in the outermost surface of the sulfide solid electrolyte material as in the specific range described above, the electrolysis of the sulfide solid electrolyte material in the outermost surface of the sulfide solid electrolyte material, which may be exposed to high potential by, for example, being in contact with an active material, can be sufficiently suppressed. Patent Literature 1 also states as follows: by reducing oxygen binding in the oxide layer in the vicinity of the boundary surface where the oxide layer is in contact with the sulfide layer as in the specific range described above, high ion conductivity can be maintained and, as a result, the charge/discharge characteristics of the battery can be further improved.

Patent Literature 2 discloses a sulfide solid electrolyte particle comprising an oxide layer on a surface thereof, the oxide layer resulting from the oxidation of the particle itself, and a sulfide solid electrolyte material. Patent Literature 2 states that the oxygen/sulfur element ratio of the surface of the sulfide solid electrolyte particle may be at least twice the oxygen/sulfur element ratio at a depth of 30 nm from the particle surface. As Example 1, Patent Literature 2 discloses a sulfide solid electrolyte particle such that the oxygen/sulfur element ratio of the particle surface is 1.54 and the oxygen/sulfur element ratio at a depth of 30 nm from the particle surface is 0.65. As Comparative Example, Patent Literature 2 discloses a sulfide solid electrolyte particle such that the oxygen/sulfur element ratio of the particle surface is 1.05 and the oxygen/sulfur element ratio at a depth of 30 nm from the particle surface is 0.54. Patent Literature 2 also states that the durability of an all-solid-state battery can be improved since the formation of a high resistance part in the interface between the sulfide solid electrolyte particle and an oxide active material, can be suppressed, and since the deterioration of the sulfide solid electrolyte particles can be suppressed.

Patent Literature 1: Japanese Patent Application Laid-Open (JP-A) No. 2018-26321

Patent Literature 2: JP-A No. 2012-94445

In practice, for the sulfide solid electrolyte material with high surface oxygen rate as disclosed in Patent Literature 1, the ion conductivity of the solid electrolyte rapidly decreases. In an all-solid-state battery comprising such a sulfide solid electrolyte material with low ion conductivity, the resistance of the interface between the sulfide solid electrolyte material and the oxide active material largely increases, and the initial resistance of the battery becomes very high. Accordingly, the all-solid-state battery can be only operated at the very low charge/discharge rate as disclosed in Patent Literature 1, and there is a problem with practical use of the all-solid-state battery.

Even for the sulfide solid electrolyte particles as disclosed in Patent Literature 2, it is still insufficient to have sufficient ion conductivity. Accordingly, further improvement is expected.

Meanwhile, a sulfide solid electrolyte is problematic in that sulfur atoms in the sulfide solid electrolyte react with the moisture in the air to generate hydrogen sulfide. A conventional sulfide solid electrolyte is problematic in that the effect of suppressing hydrogen sulfide generation, is not in sufficient. Especially in the case of a sulfide solid electrolyte having a Li/P molar ratio of more than 3 (for example, a $Li_2S/P_2S_5$ molar ratio of more than 3), while the sulfide solid electrolyte has excellent ion conductivity, there is a tendency that the sulfur atoms in the sulfide solid electrolyte react with the moisture in the air, and hydrogen sulfide is likely to be generated.

SUMMARY

In light of the above circumstances, an object of the disclosed embodiments is to provide sulfide solid electrolyte particles which have sufficient ion conductivity and which are configured to suppress hydrogen sulfide generation. Another object of the disclosed embodiments is to provide a method for producing the sulfide solid electrolyte particles and an all-solid-state battery which comprises an electrode or solid electrolyte layer comprising the sulfide solid electrolyte particles.

In a first embodiment, there are provided sulfide solid electrolyte particles comprising Li, P, S and a halogen as constituent elements and having a Li/P molar ratio of more than 3, wherein an oxygen/sulfur element ratio of a particle surface measured by XPS is 0.29 or more and 0.81 and less, and an oxygen/sulfur element ratio at a depth of 30 nm (in terms of a $SiO_2$ sputter rate) from the particle surface measured by XPS, is 0.29 or less.

The sulfide solid electrolyte particles of the disclosed embodiments may have diffraction peaks at 2θ=25.7±0.5 (deg), 2θ=30.2±0.5 (deg) and 2θ=31.6±0.5 (deg) in powder X-ray diffractometry using CuKα radiation.

In another embodiment, there is provided a method for producing the sulfide solid electrolyte particles of the disclosed embodiments, the method comprising:
preparing a sulfide solid electrolyte material,
exposing the sulfide solid electrolyte material to a predetermined water concentration atmosphere for a predetermined time to ensure that the oxygen/sulfur element ratio of the particle surface measured by XPS, is 0.29 or more and 0.81 and less, and the oxygen/sulfur element ratio at a depth of 30 nm (in terms of a $SiO_2$ sputter rate) from the particle surface measured by XPS, is 0.29 or less, and
drying the exposed sulfide solid electrolyte material.

The method for producing the sulfide solid electrolyte particles according to the disclosed embodiments may comprise exposing the sulfide solid electrolyte material to an environment water amount of 3048 ppm·h or less, which is an environment water amount (ppm·h) represented by a product of a water concentration (ppm) of an exposure atmosphere dew point and an exposure time (h), and drying the exposed sulfide solid electrolyte material.

In another embodiment, there is provided an all-solid-state battery comprising a cathode layer, an anode layer and a solid electrolyte layer disposed between the cathode layer and the anode layer,
wherein at least one of the cathode layer, the anode layer and the solid electrolyte layer comprises the sulfide solid electrolyte particles.

According to the disclosed embodiments, sulfide solid electrolyte particles which have sufficient ion conductivity and which are configured to suppress hydrogen sulfide generation, a method for producing the sulfide solid electrolyte particles, and an all-solid-state battery which comprises an electrode or solid electrolyte layer comprising the sulfide solid electrolyte particles, can be provided.

BRIEF DESCRIPTION OF THE DRAWINGS

In the accompanying drawings.

DETAILED DESCRIPTION

1. Sulfide Solid Electrolyte Particles

The sulfide solid electrolyte particles of the disclosed embodiments are sulfide solid electrolyte particles comprising Li, P, S and a halogen as constituent elements and having a Li/P molar ratio of more than 3,
wherein an oxygen/sulfur element ratio of a particle surface measured by XPS is 0.29 or more and 0.81 and less, and an oxygen/sulfur element ratio at a depth of 30 nm (in terms of a $SiO_2$ sputter rate) from the particle surface measured by XPS, is 0.29 or less.

For the sulfide solid electrolyte particles of the disclosed embodiments, as described above, the oxygen/sulfur element ratio of the particle surface measured by XPS is 0.29 or more and 0.81 and less, and the oxygen/sulfur element ratio at a depth of 30 nm (in terms of a $SiO_2$ sputter rate) from the particle surface measured by XPS is 0.29 or less.

Accordingly, compared to the inside of the particles, the oxygen/sulfur element ratio of the particle surface is high. That is, the sulfide solid electrolyte particles have an oxidized surface. The sulfide solid electrolyte particles of the disclosed embodiments may comprise, on the surface thereof, an oxide layer formed by oxidation of the sulfide solid electrolyte particles.

An example of the sulfide solid electrolyte particles of the disclosed embodiments will be described with reference to figures. In the accompanying drawings, for ease of illustration and understanding, the scale and the horizontal to vertical dimensional ratio of the components in the figures are appropriately changed from those of the actual product and exaggerated.

Figure 1:
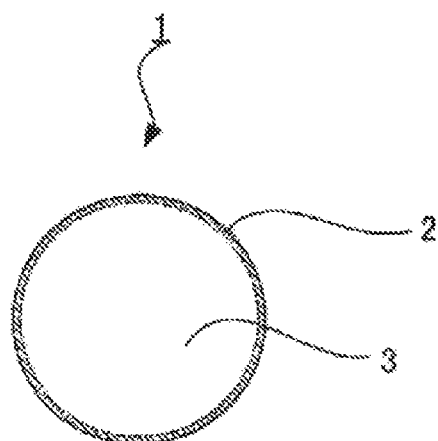
FIG. 1 is a schematic sectional view of an example of the structure of the sulfide solid electrolyte particles according to the disclosed embodiments.

For example, as shown in FIG. 1, a sulfide solid electrolyte particle 1 of the disclosed embodiments is covered with an oxide layer 2, which is formed by oxidation of the surface of a particle composed of a sulfide solid electrolyte (a sulfide solid electrolyte material) 3 comprising Li, P, S and a halogen as constituent elements and having a Li/P molar ratio of more than 3.

The surface of the sulfide solid electrolyte particles of the disclosed embodiments is oxidized to ensure that the oxygen/sulfur element ratio of the surface of the sulfide solid electrolyte particles and the oxygen/sulfur element ratio at a depth of 30 nm from the particle surface, the sulfide solid electrolyte particles comprising Li, P, S and a halogen as constituent elements and having a Li/P molar ratio of more than 3, satisfy the above-specified values. Accordingly, the sulfide solid electrolyte particles of the disclosed embodiments obtain sufficient ion conductivity and suppress hydrogen sulfide generation.

As described above, the sulfide solid electrolyte which is used to form the sulfide solid electrolyte particles of the disclosed embodiments and which has a Li/P molar ratio of more than 3, is excellent in ion conductivity. However, as described above, there is such a tendency that the sulfur atoms in the sulfide solid electrolyte react with the moisture in the air, and hydrogen sulfide is likely to be generated. The reason is considered as follows. For example, in the case of the sulfide solid electrolyte having a Li/P molar ratio of more than 3 (for example, a $Li_2S/P_2S_5$ molar ratio of more than 3), due to the composition of Li, P and S, the composition range becomes a composition range in which a $S^{2-}$ unit coexists with a $PS_4^{3-}$ unit, and the $S^{2-}$ unit is especially reactive with moisture and is likely to generate hydrogen sulfide.

Especially, a sulfide solid electrolyte having an argyrodite-type crystal structure has high ion conductivity; meanwhile, there is a problem that it generates large amounts of hydrogen sulfide.

In the disclosed embodiments, to further increase the ion conductivity and to decrease the amount of the $S^{2-}$ unit, which is a hydrogen sulfide source in the sulfide solid electrolyte, sulfur atoms as the $S^{2-}$ unit present in the structure of the sulfide solid electrolyte, are substituted with halogen atoms, and the sulfur atoms as the $S^{2-}$ unit present on the surface of the particles composed of the sulfide solid electrolyte, are substituted with oxygen atoms in an appropriate range. Due to containing halogen atoms, the ion conductivity can be increased compared to the sulfide solid electrolyte comprising Li, P, S and not comprising a halogen. However, from the viewpoint of maintaining the structure, it is impossible to substitute all of the sulfur atoms as the $S^{2-}$ unit present in the structure of the sulfide solid electrolyte with halogen atoms. Accordingly, the sulfide solid electrolyte simply having the composition comprising Li, P, S and a halogen as constituent elements, is insufficient to suppress hydrogen sulfide generation. Meanwhile, in the disclosed embodiments, the sulfur atoms as the $S^{2-}$ unit present on the surface of the particles composed of the sulfide solid electrolyte comprising Li, P, S and a halogen as constituent elements and having a Li/P molar ratio of more than 3, are further substituted with oxygen atoms. The ion conductivity is decreased by oxidizing the surface of the particles composed of the sulfide solid electrolyte. However, in the disclosed embodiments, the sulfur atoms are substituted with oxygen atoms in a range that is appropriate to maintain excellent ion conductivity, whereby the thus-obtained sulfide solid electrolyte particles have sufficient ion conductivity and suppress hydrogen sulfide generation.

[Oxygen/Sulfur Element Ratio]

For the sulfide solid electrolyte particles of the disclosed embodiments, the oxygen/sulfur element ratio of the particle surface measured by XPS is 0.29 or more and 0.81 and less.

If the sulfide solid electrolyte particles of the disclosed embodiments contain the above-specified sulfide solid electrolyte and the oxygen/sulfur element ratio of the particle surface measured by XPS is less than 0.29, the sulfur atoms as the $S^{2-}$ unit present on the particle surface, cannot be sufficiently substituted with oxygen atoms. Accordingly, there is a possibility that hydrogen sulfide generation cannot be sufficiently suppressed. For the sulfide solid electrolyte particles of the disclosed embodiments, from the viewpoint of obtaining an excellent hydrogen sulfide generation suppressing effect, the oxygen/sulfur element ratio of the particle surface measured by XPS may be 0.60 or more, or it may be 0.70 or more.

If the sulfide solid electrolyte particles of the disclosed embodiments contain the above-specified sulfide solid electrolyte and the oxygen/sulfur element ratio of the particle surface measured by XPS is more than 0.81, the ion conductivity of the sulfide solid electrolyte particles may rapidly decrease.

For the sulfide solid electrolyte particles of the disclosed embodiments, the oxygen/sulfur element ratio at a depth of 30 nm (in terms of a $SiO_2$ sputter rate) from the particle surface measured by XPS, is 0.29 or less. Since the oxygen/sulfur element ratio at a depth of 30 nm (in terms of a $SiO_2$ sputter rate) from the particle surface measured by XPS is 0.29 or less, a decrease in the ion conductivity of the sulfide solid electrolyte particles is suppressed, and excellent ion conductivity is maintained. As long as the oxygen/sulfur element ratio of the particle surface is in the above-specified range, the lower limit of the oxygen/sulfur element ratio at a depth of 30 nm (in terms of a $SiO_2$ sputter rate) from the particle surface, is not particularly limited. In general, the oxygen/sulfur element ratio at a depth of 30 nm from the particle surface is smaller than the oxygen/sulfur element ratio of the surface of the sulfide solid electrolyte particles. It may be half or less with respect to the oxygen/sulfur element ratio of the particles surface. The oxygen/sulfur element ratio at a depth of 30 nm (in terms of a $SiO_2$ sputter rate) from the particle surface, may be 0.00, and the lower limit may be about 0.10.

In the disclosed embodiments, the oxygen/sulfur element ratio is a value measured by X-ray photoelectron spectroscopy (XPS). For example, the oxygen/sulfur element ratio can be measured by use of a XPS device ("ULVAC-PHI" manufactured by ULVAC, Inc.)

By use of the XPS device, XPS and sputtering can be combined for depth direction analysis. In particular, the oxygen/sulfur element ratio can be measured as follows: XPS measurement is carried out with sputtering at a predetermined sputter rate; a depth profile is obtained in advance, which is a graph showing the relationship between sputter time and XPS intensity; the depth from the surface is calculated from the sputter rate value obtained by the measurement; and the oxygen/sulfur element ratio at the depth is measured.

When the sulfide solid electrolyte particles of the disclosed embodiments are sulfide solid electrolyte particles comprising, on the surface thereof, the oxide layer formed by the oxidation of the surface of the sulfide solid electrolyte particles, generally, the oxygen/sulfur element ratio continuously decreases as the depth from the surface increases, and the oxygen/sulfur element ratio converges to the original oxygen/sulfur element ratio of the sulfide solid electrolyte of the sulfide solid electrolyte particles. Accordingly, from the viewpoint of preventing defects such as the removal of the oxide layer, the sulfide solid electrolyte particles of the disclosed embodiments may comprise, on the surface thereof, the oxide layer formed by the oxidation of the surface of the sulfide solid electrolyte particles.

[Sulfide Solid Electrolyte]

For the sulfide solid electrolyte particles of the disclosed embodiments, a sulfide solid electrolyte that comprises lithium (Li), phosphorus (P), sulfur (S) and a halogen as constituent elements, is used. For example, the sulfide solid electrolyte particles of the disclosed embodiments may be composed of a $Li_2S$—$P_2S_5$—LiX-based sulfide solid electrolyte obtained from $Li_2S$, $P_2S_5$ and LiX (where X is one or more kinds of elements selected from the group consisting of halogens), which is a sulfide solid electrolyte having a $Li_2S/P_2S_5$ molar ratio of more than 3.

The halogen as X may be one or more kinds of elements selected from the group consisting of fluorine (F), chlorine (Cl), bromine (Br) and iodine (I). From the viewpoint of ion conductivity, the halogen as X may be one or more kinds of elements selected from the group consisting of I, Br and Cl.

For example, the sulfide solid electrolyte that comprises Li, P, S and a halogen as constituent elements, may be a sulfide solid electrolyte of the composition represented by the following general formula: $a(LiX) \cdot (1-a)(bLi_2S \cdot (1-b)P_2S_5)$, when the constituent elements Li, P, S and halogen (X) are converted to $Li_2S$, $P_2S_5$ and LiX. In the general formula, "a" corresponds to the total molar ratio of LiX with respect to the total mole of LiX, $Li_2S$ and $P_2S_5$, and "b" corresponds to the molar ratio of $Li_2S$ with respect to the total mole of $Li_2S$ and $P_2S_5$.

For example, "a" may be 0.1 or more and 0.3 or less, or it may be 0.15 or more and 0.25 or less, from the viewpoint of the composition range in which high ion conductivity is obtained.

For example, "b" may be more than 0.75 and 0.95 or less, or it may be 0.8 or more and 0.9 or less, from the viewpoint of the composition range in which highly ion-conducting crystals are precipitated.

One halogen or two or more kinds of halogens may be contained in the sulfide solid electrolyte that comprises Li, P, S and a halogen as constituent elements.

From the viewpoint of ion conductivity, it may be a sulfide solid electrolyte that comprises Li, P, S and Cl as constituent elements, or it may be a $Li_2S$—$P_2S_5$—LiCl-based sulfide solid electrolyte obtained from $Li_2S$, $P_2S_5$ and LiCl.

When two or more kinds of halogens are contained, the mixing ratio of the halogens is not particularly limited. As described above, when the constituent elements Li, P, S and halogen (X) are converted to $Li_2S$, $P_2S_5$ and LiX, and, for example, when LiCl and LiBr are mixed, "c" in the resulting cLiCl·(1−c)LiBr may be 0.0 or more and 1.0 or less, or it may be 0.5 or more and 1.0 or less.

The sulfide solid electrolyte used in the sulfide solid electrolyte particles of the disclosed embodiments, may be amorphous or may include a crystal structure in at least a part thereof. The crystal state of the sulfide solid electrolyte of the sulfide solid electrolyte particles can be confirmed by, for example, powder X-ray diffractometry using CuKα radiation.

From the viewpoint of ion conductivity, at least a part of the sulfide solid electrolyte of the sulfide solid electrolyte particles of the disclosed embodiments, may include a crystal structure. For example, the sulfide solid electrolyte of the sulfide solid electrolyte particles may have diffraction peaks at 2θ=25.7±0.5 (deg), 2θ=30.2±0.5 (deg) and 2θ=31.6±0.5 (deg) in powder X-ray diffractometry using CuKα radiation.

The sulfide solid electrolyte of the sulfide solid electrolyte particles of the disclosed embodiments, is a sulfide solid electrolyte that comprises Li, P, S and a halogen as constituent elements. In addition, the sulfide solid electrolyte may comprise other element(s). As the other element(s), examples include, but are not limited to, oxygen, carbon, hydrogen and zirconia.

For the sulfide solid electrolyte of the sulfide solid electrolyte particles of the disclosed embodiments, the constituent elements Li, P, S and halogen may account for 100% by mole of the constituent elements excluding oxygen.

The molar ratio of the elements in the sulfide solid electrolyte can be controlled by controlling the amounts of the elements contained in raw materials. The molar ratio and composition of the elements contained in the sulfide solid electrolyte can be measured by inductively coupled plasma (ICP) atomic emission spectroscopy.

[Sulfide Solid Electrolyte Particles]

As the form of the sulfide solid electrolyte particles of the disclosed embodiments, examples include, but are not limited to, a perfect spherical form and an oval spherical form. The average particle diameter of the sulfide solid electrolyte particles may be in a range of from 0.1 μm to 100 μm, for example. The average particle diameter may be in a range of from 0.5 μm to 20 μm, or it may be in a range of from 0.5 μm to 10 μm.

The average particle diameter of the sulfide solid electrolyte particles may be obtained from, for example, values measured by image analysis using an electron microscope (such as SEM).

For the lithium ion conductivity at 25° C. of the sulfide solid electrolyte particles of the disclosed embodiments, the lower limit may be 2.1 mS/cm or more, or it may be 2.4 mS/cm or more. The upper limit is not particularly limited, and it may be 3.4 mS/cm or less.

[Method for Producing the Sulfide Solid Electrolyte Particles]

The method for producing the sulfide solid electrolyte particles of the disclosed embodiments is not particularly limited, as long as it is a method by which the sulfide solid electrolyte particles of the disclosed embodiments are obtained. From the viewpoint of achieving the objects of the disclosed embodiments, the method for producing the sulfide solid electrolyte particles of the disclosed embodiments, may comprise the step of preparing a sulfide solid electrolyte material and oxidizing the surface of the sulfide solid electrolyte material to obtain the above-specified oxygen/sulfur element ratio.

As the method for producing the sulfide solid electrolyte particles of the disclosed embodiments, for example, the following sulfide solid electrolyte particle production method may be used.

The sulfide solid electrolyte particle production method of the disclosed embodiments is a method for producing the sulfide solid electrolyte particles of the disclosed embodiments, the method comprising:

preparing a sulfide solid electrolyte material, exposing the sulfide solid electrolyte material to a predetermined water concentration atmosphere for a predetermined time to ensure that the oxygen/sulfur element ratio of the particle surface measured by XPS, is 0.29 or more and 0.81 and less, and the oxygen/sulfur element ratio at a depth of 30 nm (in terms of a $SiO_2$ sputter rate) from the particle surface measured by XPS, is 0.29 or less, and drying the exposed sulfide solid electrolyte material.

(Preparing a Sulfide Solid Electrolyte Material)

From the viewpoint of achieving the objects of the disclosed embodiments, the sulfide solid electrolyte material used to produce the sulfide solid electrolyte particles of the disclosed embodiments, may be produced from a raw material composition containing $Li_2S$, $P_2S_5$ and LiX (where X is one or more kinds of elements selected from the group consisting of halogens). The raw material composition may be amorphized to form a sulfide solid electrolyte glass, or the sulfide solid electrolyte glass may be crystallized.

As the method for amorphizing the raw material composition, examples include, but are not limited to, mechanical milling and a melt-quenching method. The amorphizing method may be mechanical milling. This is because the raw material composition can be amorphized at normal temperature, and the production process can be simplified.

The melt-quenching method has a limit to a reaction atmosphere or reaction container used. Meanwhile, the mechanical milling is advantageous in that a sulfide solid electrolyte glass of a desired composition can be simply and easily synthesized.

The mechanical milling may be dry or wet mechanical milling. The mechanical milling may be the latter. This is because the raw material composition can be prevented from attaching to the inner wall surface of a container, etc., and a sulfide solid electrolyte glass with higher amorphous nature can be obtained.

The mechanical milling is not particularly limited, as long as it is a method for mixing the raw material composition by applying mechanical energy thereto. The mechanical milling may be carried out by, for example, a ball mill, a vibrating mill, a turbo mill, mechanofusion, or a disk mill. The mechanical milling may be carried out by a ball mill, or it may be carried out by a planetary ball mill. This is because the desired sulfide solid electrolyte glass can be efficiently obtained.

The conditions of the mechanical milling are determined to ensure that the desired sulfide solid electrolyte glass can be obtained. For example, in the case of using the planetary ball mill, the raw material composition and grinding balls are put in a container, and mechanical milling is carried out at a predetermined rotational frequency for a predetermined time. In general, the larger the rotational frequency, the faster the production speed of the sulfide solid electrolyte glass. Also, the longer the treatment time, the higher the conversion rate of the raw material composition into the sulfide solid electrolyte glass.

In the case of using the planetary ball mill, the plate rotational frequency is in a range of from 200 rpm to 500 rpm, for example. The plate rotational frequency may be in a range of from 250 rpm to 400 rpm.

In the case of using the planetary ball mill, the mechanical milling time is in a range of from 1 hour to 100 hours, for example. The mechanical milling time may be in a range of from 1 hour to 50 hours.

As the material for the container and grinding balls used in the ball mill, examples include, but are not limited to, $ZrO_2$ and $Al_2O_3$.

The diameter of the grinding balls is in a range of from 1 mm to 20 mm, for example.

A liquid is used for wet mechanical milling. The liquid may be a liquid that does not produce hydrogen sulfide in a reaction with the raw material composition. Hydrogen sulfide can be produced when protons are dissociated from the molecules of the liquid and reacted with the raw material composition or the sulfide solid electrolyte glass. Accordingly, the liquid may have aprotic properties to a degree that does not result in the production of hydrogen sulfide. Aprotic liquids can be broadly classified into polar and non-polar aprotic liquids.

The polar aprotic liquid is not particularly limited. As the polar aprotic liquid, examples include, but are not limited to, ketones such as acetone; nitriles such as acetonitrile; amides such as N,N-dimethylformamide (DMF); and sulfoxides such as dimethylsulfoxide (DMSO).

As the non-polar aprotic liquid, examples include, but are not limited to, aliphatic hydrocarbons such as heptane; aromatic hydrocarbons such as benzene, toluene and xylene; chain ethers such as diethyl ether and dimethyl ether; cyclic ethers such as tetrahydrofuran; alkyl halides such as chloroform, methyl chloride and methylene chloride; esters such as ethyl acetate; and fluorine compounds such as benzene fluoride, heptane fluoride, 2,3-dihydroperfluoropentane, and 1,1,2,2,3,3,4-heptafluorocyclopentane. The amount of the added liquid is not particularly limited, and it may be an amount to a degree that can obtain the desired sulfide solid electrolyte.

The thus-obtained sulfide solid electrolyte glass may be further pulverized into small-diameter glass particles.

In this case, as with the above-described mechanical milling, the sulfide solid electrolyte glass and grinding balls were put in a container, and the container is subjected to pulverization at a predetermined rotational frequency for a predetermined time.

Also in this case, the diameter of the grinding balls may be in a range of from 0.3 mm to 1.0 mm, for example.

To ensure that the sulfide solid electrolyte glass is pulverized by wet mechanical milling, the pulverization may be carried out in the presence of the liquid used for the above-described wet mechanical milling.

The thus-obtained sulfide solid electrolyte glass or the thus-obtained small-diameter glass particles may be crystallized.

As the step of crystallizing the sulfide solid electrolyte glass or the small-diameter glass particles, examples include, but are not limited to, the step of crystallizing the sulfide solid electrolyte glass or the small-diameter glass particles by heating at a temperature that is equal to or higher than the crystallization temperature of the glass.

The crystallization temperature (Tc) of the sulfide solid electrolyte glass or the small-diameter glass particles can be measured by thermal analysis measurement (DTA).

The heating temperature may be a temperature higher than the crystallization temperature (Tc) of the sulfide solid electrolyte glass or the small-diameter glass particles, which is a temperature observed by thermal analysis measurement.

In general, it is 195° C. or more, or it may be 200° C. or more. On the other hand, the upper limit of the heating temperature is not particularly limited. The upper limit may be a temperature obtained by adding up to 20° C. to the crystallization temperature (Tc).

The heating time is not particularly limited, as long as the desired crystallinity is obtained. For example, it is in a range of from one minute to 24 hours, or it may be in a range of from one minute to 10 hours.

The heating may be carried out in an inert gas atmosphere such as argon gas and nitrogen gas.

The heating method is not particularly limited. For example, a firing furnace may be used.

In the sulfide solid electrolyte material obtained through the heating step, the glass may be absolutely crystallized by the heating, or the glass may fail to be absolutely crystallized and may remain therein.

(Exposing the Surface of the Sulfide Solid Electrolyte Material to Water)

In the production method the disclosed embodiments, the sulfide solid electrolyte material is exposed to a predetermined water concentration atmosphere for a predetermined time to ensure that the oxygen/sulfur element ratio of the particle surface measured by XPS, is 0.29 or more and 0.81 and less, and the oxygen/sulfur element ratio at a depth of 30 nm (in terms of a $SiO_2$ sputter rate) from the particle surface measured by XPS, is 0.29 or less, whereby the surface of the sulfide solid electrolyte material is oxidized to form the oxide layer.

The exposure conditions for exposing the surface of the sulfide solid electrolyte material to a predetermined water concentration atmosphere for a predetermined time, may be appropriately controlled to ensure that the oxygen/sulfur element ratio is in the above-specified range. For example, the above-described exposing step and the below-described drying step are carried out as a preliminary experiment, and then the exposure conditions in which the oxide layer with the desired oxygen/sulfur element ratio is formed, may be determined.

The exposure atmosphere dew point may be −80° C. or more and 0° C. or less, may be −70° C. or more, or may be −40° C. or less, for example.

The water concentration (volume fraction) of the exposure atmosphere dew point may be 0.5 ppm or more and 6032 ppm or less, which corresponds to the dew point of −80° C. or more and 0° C. or less, may be 2 ppm or more, which corresponds to −70° C. or more, or may be 127 ppm or less, which corresponds to −40° C. or less, for example.

If the water concentration is too high in the exposure, the $PS_4^{3-}$ unit is further oxidized and may result in a decrease in the ion conductivity. The water concentration of the exposure atmosphere may be in the above range, since the $S^{2-}$ unit is oxidized more preferentially than the $PS_4^{3-}$ unit and, as a result, the ion conductivity can be maintained.

The exposure time required to expose the surface of the sulfide solid electrolyte material to the predetermined water concentration atmosphere, may be appropriately controlled depending on the water concentration. For example, the exposure time may be 0.5 hour or more and 96 hours or less. From the viewpoint of production efficiency, it may be 48 hours or less, or it may be 24 hours or less.

The exposure conditions for exposing the surface of the sulfide solid electrolyte material to the predetermined water concentration atmosphere for the predetermined time, may be appropriately controlled to ensure that the oxygen/sulfur element ratio is in the above-specified range. For example, the environment water amount (ppm·h) represented by the product of the water concentration (ppm) of the exposure atmosphere dew point and the exposure time (h) may be 3048 ppm·h or less.

As the method for exposing the sulfide solid electrolyte material to the predetermined water concentration atmosphere, examples include, but are not limited to, leaving the particles to stand in an Ar glove box, a dry air glove box, a dry room or the like, in which the atmosphere dew point was controlled as described above.

(Drying Step)

The drying step is a step in which moisture is removed from the oxide layer formed on, by the above-described exposing step and the resulting oxidation, the surface of the sulfide solid electrolyte material, thereby forming the sulfide solid electrolyte particles comprising, on the surface thereof, the moisture-free oxide layer.

The drying method used in this step is not particularly limited and may be a commonly-used method, as long as it is a method by which the moisture-free oxide layer is obtained. As the drying method, examples include, but are not limited to, a method for drying the surface of the sulfide solid electrolyte material in a predetermined atmosphere, at a predetermined temperature, for a predetermined time.

For example, the above-described exposing step and drying step are carried out as a preliminary experiment, and then the drying conditions in which the oxide layer with the desired oxygen/sulfur element ratio is formed, such as temperature, humidity and time, may be determined.

The drying atmosphere is not particularly limited, as long as it is an atmosphere in which moisture can be removed from the moisture-containing oxide layer by drying, thereby forming a moisture-free oxide layer. As the drying atmosphere, examples include, but are not limited to, heat drying and a vacuum atmosphere. From the viewpoint of quick removal of physisorbed water, the drying atmosphere may be heat drying.

The heat drying may be heating at a temperature of about 100° C. or more and about 150° C. or less, for example.

The heating time is not particularly limited, as long as it is a time that allows water removal. For example, it may be in a range of from one minute to 24 hours, or it may be in a range of from one minute to 10 hours.

The heating may be carried out in an inert gas atmosphere such as argon gas and nitrogen gas.

The heat drying method is not particularly limited. For example, it may be carried out by use of a hot plate, a small drying furnace, a small vacuum heat drying furnace, or the like.

[Applications of the Sulfide Solid Electrolyte Particles]

The sulfide solid electrolyte particles of the disclosed embodiments may be used in an all-solid-state battery, for example. As the type of the all-solid-state battery, examples include, but are not limited to, an all-solid-state lithium battery, an all-solid-state lithium ion battery, an all-solid-state magnesium battery, an all-solid-state sodium battery and an all-solid-state calcium battery. The all-solid-state battery may be an all-solid-state lithium battery, an all-solid-state lithium ion battery, or an all-solid-state sodium battery, or the all-solid-state battery may be an all-solid-state lithium battery or an all-solid-state lithium ion battery.

2. All-Solid-State Battery

The all-solid-state battery of the disclosed embodiments is an all-solid-state battery comprising a cathode layer, an anode layer and a solid electrolyte layer disposed between the cathode layer and the anode layer, wherein at least one of the cathode layer, the anode layer and the solid electrolyte layer comprises the sulfide solid electrolyte particles of the disclosed embodiments.

Figure 2:
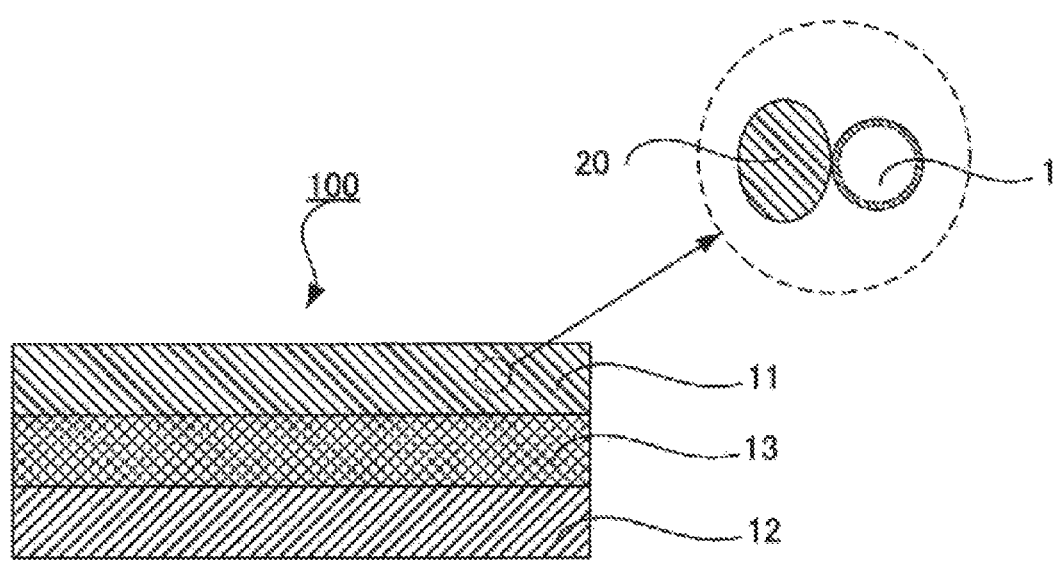
FIG. 2 is a schematic sectional view of an example of the power generation element of the all-solid-state battery according to the disclosed embodiments.

FIG. 2 is a schematic sectional view of an example of the power generation element of the all-solid-state battery according to the disclosed embodiments. A power generation element 100 shown in FIG. 2 comprises a cathode layer 11, an anode layer 12, and a solid electrolyte layer 13 disposed between the cathode layer 11 and the anode layer 12. In the cathode layer 11, a cathode active material 20 and sulfide solid electrolyte particles 1 are contained and uniformly mixed.

In FIG. 2, during the all-solid-state battery is charged, for example, lithium ions are extracted from the cathode active material 20 in the cathode layer 11 and transfers to the anode layer 12 through the sulfide solid electrolyte particles 1 and the solid electrolyte layer 13. On the other hand, during the all-solid-state battery is discharged, lithium ions are extracted from the anode layer 12 and transfers to the cathode active material 20 through the solid electrolyte layer 13. In general, during the all-solid-state battery is charged/discharged, lithium ions transfer through the interface between the cathode active material and the sulfide solid electrolyte material. Accordingly, to allow the all-solid battery to be a high-power all-solid-state battery, it is important to increase the ion conductivity.

In FIG. 2, since the surface of the sulfide solid electrolyte particles 1 is oxidized in a predetermined range, the cathode active material 20 and the sulfide solid electrolyte particles have sufficient ion conductivity and suppress hydrogen sulfide generation.

In the above description, the case where the cathode layer comprises the sulfide solid electrolyte particles of the disclosed embodiments, is exemplified. However, the disclosed embodiments are not limited to this case.

For example, the solid electrolyte layer 13 may comprise the sulfide solid electrolyte particles 1, or the anode layer 12 may comprise an anode active material and the sulfide solid electrolyte particles 1 of the disclosed embodiments.

For the all-solid-state battery of the disclosed embodiments, from the viewpoint of obtaining sufficient ion conductivity and suppressing hydrogen sulfide generation, all of the cathode layer, the anode layer and the solid electrolyte layer may comprise the sulfide solid electrolyte particles of the disclosed embodiments.

Hereinafter, the components of the all-solid-state battery of the disclosed embodiments will be described in order.

[Cathode Layer]

The cathode layer comprises at least a cathode active material and a solid electrolyte. As needed, it comprises an electroconductive material and a binder. As the solid electrolyte, the sulfide solid electrolyte particles of the disclosed embodiments may be contained, from the viewpoint of obtaining sufficient ion conductivity and suppressing hydrogen sulfide generation.

In the case where the sulfide solid electrolyte particles of the disclosed embodiments are contained as the solid electrolyte of the cathode layer, an oxide cathode active material may be used as the cathode active material, since the surface of the sulfide solid electrolyte particles is oxidized, and compared to the case where the particle surface is not oxidized, a resistance increase rate after charge-discharge cycles can be suppressed.

As the oxide cathode active material, examples include, but are not limited to, a cathode active material represented by the following general formula: $Li_xM_yO_z$ (where M is a transition metal element; x is from 0.02 to 2.2; y is from 1 to 2; and z is from 1.4 to 4). The transition metal element M may be at least one selected from the group consisting of Co, Mn, Ni, V, Fe and Si, or it may be at least one selected from the group consisting of Co, Ni and Mn. As the oxide cathode active material, examples include, but are not limited to, $LiCoO_2$, $LiMnO_2$, $LiNiO_2$, $LiVO_2$, $LiNi_{1/3}Co_{1/3}Mn_{1/3}O_2$, $LiMn_2O_4$, $Li(Ni_{0.5}Mn_{1.5})O_4$, $Li_2FeSiO_4$ and $Li_2MnSiO_4$. Cathode active materials other than the one represented by the general formula $Li_xM_yO_z$ include, for example, olivine-type cathode active materials such as $LiFePO_4$ and $LiMnPO_4$.

As the cathode active material of the cathode layer, a conventionally-known cathode active material other than the oxide cathode active materials may be used.

The form of the cathode active material is not limited. As the form of the cathode active material, examples include, but are not limited to, a particulate form and a plate form.

The content of the cathode active material in the cathode layer is not particularly limited. For example, it may be in a range of from 10 mass % to 99 mass %, may be in a range of from 20 mass % to 90 mass %, or may be in a range of from 40 mass % to 85 mass %.

In the case where the sulfide solid electrolyte particles of the disclosed embodiments are contained as the solid electrolyte of the cathode layer, the content of the sulfide solid electrolyte particles of the disclosed embodiments in the cathode layer, is not particularly limited. For example, it may be in a range of from 1 mass % to 80 mass %, may be in a range of from 5 mass % to 70 mass %, or may be in a range of from 10 mass % to 50 mass %.

In the case where the cathode layer does not comprise the sulfide solid electrolyte particles of the disclosed embodiments, a solid electrolyte may be appropriately selected from solid electrolytes exemplified below in connection with the below-described solid electrolyte layer, and it may be used as the solid electrolyte. In the case where the cathode layer does not comprise the sulfide solid electrolyte particles of the disclosed embodiments, the content of the solid electrolyte may be the same as the content of the sulfide solid electrolyte particles.

As the electroconductive material, examples include, but are not limited to, carbonaceous materials such as acetylene black and Ketjen black, fibrous carbon such as carbon fiber, and metal materials.

The content of the electroconductive material in the cathode layer is not particularly limited. For example, it may be in a range of from 0 mass % to 10 mass %, or it may be in a range of from 1 mass % to 5 mass %.

The binder is not particularly limited. As the binder, examples include, but are not limited to, butadiene rubber (BR), polyvinylidene fluoride (PVDF) and styrene-butadiene rubber (SBR).

The content of the binder in the cathode layer is not particularly limited. For example, it may be in a range of from 0 mass % to 20 mass %, or it may be in a range of from 0.1 mass % to 10 mass %.

The thickness of the cathode layer is not particularly limited. For example, it may be from 10 μm to 250 μm, or it may be from 20 μm to 200 μm.

[Anode Layer]

The anode layer comprises at least an anode active material and a solid electrolyte. As needed, it comprises an electroconductive material and a binder. The solid electrolyte may comprise the sulfide solid electrolyte particles of the disclosed embodiments, from the viewpoint of obtaining sufficient ion conductivity and suppressing hydrogen sulfide generation.

In the case where the sulfide solid electrolyte particles of the disclosed embodiments are contained as the solid electrolyte of the anode layer, an oxide anode active material may be used as the anode active material, since the surface of the sulfide solid electrolyte particles is oxidized, and compared to the case where the particle surface is not oxidized, the resistance increase rate after charge-discharge cycles can be suppressed.

As the oxide anode active material, examples include, but are not limited to, an active material having a spinel structure. As the active material, examples include, but are not limited to, $Li_4Ti_5O_{12}$, $Li_4Mn_2O_4$ and $Li_4Mn_5O_{12}$.

As the anode active material of the anode layer, a conventionally-known anode active material other than the oxide anode active material, may be used. As the conventionally-known anode active material, examples include, but are not limited to, Li metal, graphite, Si metal and Si alloy.

The form of the anode active material is not particularly limited. As the form, examples include, but are not limited to, a particulate form and a plate form.

In the anode layer, the content of the anode active material, that of the sulfide solid electrolyte particles of the disclosed embodiments and that of the solid electrolyte may be the same as those of the cathode layer.

The electroconductive material and binder contained in the anode layer and the contents thereof, may be the same as the electroconductive material and binder contained in the cathode layer and the contents thereof.

[Solid Electrolyte Layer]

The solid electrolyte layer comprises at least a solid electrolyte. As needed, it may comprise a binder, etc.

As the solid electrolyte used in the solid electrolyte layer, examples include, but are not limited to, an oxide-based solid electrolyte material and a sulfide-based solid electrolyte material. From the viewpoint of high lithium ion conductivity, the solid electrolyte used in the solid electrolyte layer may be a sulfide solid electrolyte material.

The solid electrolyte of the solid electrolyte layer may comprise the sulfide solid electrolyte particles of the disclosed embodiments, from the viewpoint of obtaining sufficient ion conductivity and suppressing hydrogen sulfide generation.

In the solid electrolyte layer, a sulfide-based solid electrolyte material different from the sulfide solid electrolyte particles of the disclosed embodiments, may be used. As the different sulfide-based solid electrolyte material, examples include, but are not limited to, $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $LiI$—$Li_2O$—$Li_2S$—$P_2S_5$, $LiBr$—$LiI$—$Li_2S$—$P_2S_5$, and $Li_2S$—$P_2S_5$.

More specifically, examples include, but are not limited to, $Li_7P_3S_{11}$, $Li_3PS_4$, $Li_8P_2S_9$, $Li_{13}GeP_3S_{16}$, $Li_{10}GeP_2S_{12}$, $15LiBr \cdot 10LiI \cdot 75(0.75Li_2S \cdot 0.25P_2S_5)$ and $70(0.06Li_2O \cdot 0.69Li_2S \cdot 0.25P_2S_5) \cdot 30LiI$. These compositions are on a molar basis.

As the sulfide-based solid electrolyte material different from the sulfide solid electrolyte particles of the disclosed embodiments, sulfide solid electrolyte particles in such a state that they are not yet subjected to the particle surface oxidizing step and the oxygen concentration of the particle surface is less than the range of the sulfide solid electrolyte particles of the disclosed embodiments, may be used.

As the solid electrolyte, one or more kinds of solid electrolytes may be used.

The content of the solid electrolyte in the solid electrolyte layer is not particularly limited. For example, it may be 50 mass % or more, may be 100 mass %, may be in a range of from 70 mass % to 99.99 mass %, or may be in a range of from 90 mass % to 99.9 mass %.

The binder that may be contained in the solid electrolyte layer as needed, may be the same as the binder contained in the cathode layer.

The content of the binder in the solid electrolyte layer is not particularly limited. For example, it may be in a range of from 0 mass % to 20 mass %, or it may be in a range of from 0.1 mass % to 10 mass %.

The thickness of the solid electrolyte layer is not particularly limited. It may be the same as the thickness of a solid electrolyte film generally used in an all-solid-state lithium secondary battery.

[Cathode Current Collector and Anode Current Collector]

In the all-solid-state battery of the disclosed embodiments, a cathode current collector and an anode current collector, which are not shown in FIG. 2, are generally used. The cathode current collector collects current from the cathode layer. The cathode current collector is not particularly limited, as long as it functions as a cathode current collector. The material for the cathode current collector is not particularly limited, as long as it is an electroconductive material. As the material, examples include, but are not limited to, stainless-steel (SUS), aluminum, nickel, iron, titanium, copper and carbon. The cathode current collector may be a dense metal current collector or a porous metal current collector.

The anode current collector collects current from the anode layer. The anode current collector is not particularly limited, as long as it functions as an anode current collector. As the material for the anode current collector, examples include, but are not limited to, those exemplified above as the material for the cathode current collector.

The cathode and anode current collectors used in the disclosed embodiments may also function as a battery casing. For example, a battery casing made of SUS is prepared, and a part of the battery casing may be used to collect current.

[Other Component]

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is stable in electrolyte. As the material, examples include, but are not limited to, resins such as polypropylene, polyethylene and acrylic resin.

As the all-solid-state battery, examples include, but are not limited to, an all-solid-state lithium battery, an all-solid-state lithium ion battery, an all-solid-state magnesium battery, an all-solid-state sodium battery and an all-solid-state calcium battery. The all-solid-state battery may be an all-solid-state lithium battery, an all-solid-state lithium ion battery, or an all-solid-state sodium battery, or it may be an all-solid-state lithium battery or an all-solid-state lithium ion battery.

As the form of the all-solid-state battery, examples include, but are not limited to, a coin form, a laminate form, a cylindrical form and a square form.

The method for producing the all-solid-state battery of the disclosed embodiments is not particularly limited, as long as it is a method by which the above-described all-solid-state battery is obtained. As the method, a common all-solid-state battery production method may be used. As the method for producing the all-solid-state battery, examples include, but are not limited to, the following method: the material for the cathode layer, the material for the solid electrolyte layer, and the material for the anode layer are pressed in order, thereby producing a power generation element; this power generation element is stored in the battery casing; and the battery casing is swaged, thereby producing the all-solid-state battery.

EXAMPLES

Comparative Example 1

First, 0.5503 g of $Li_2S$ (manufactured by Furuuchi Chemical Corporation), 0.8874 g of $P_2S_5$ (manufactured by Aldrich) and 0.2850 g of LiCl (manufactured by Kojundo Chemical Laboratory Co., Ltd.) were put in a zirconia pot (45 ml) containing zirconia balls (diameter 5 mm). Then, 4 g of dehydrated heptane (manufactured by Kanto Chemical Co., Inc.) was put in the zirconia pot. The pot was closed. The zirconia pot was installed in a planetary ball mill ("P-7" manufactured by Fritsch) and subjected to mechanical milling for 20 hours, thereby obtaining a sulfide solid electrolyte glass.

The sulfide solid electrolyte glass was put in a carbon-coated quartz tube and vacuum-encapsulated to produce an ampule. This ampule was heated at 500° C. for 3 hours, thereby obtaining sulfide solid electrolyte particles C1. The Li/P molar ratio of the sulfide solid electrolyte particles C1 was 3.8.

The oxygen/sulfur element ratio of the surface of the sulfide solid electrolyte particles C1 and the oxygen/sulfur element ratio at a depth of 30 nm from the particle surface, were obtained by XPS measurement described below. The results are shown in Table 1.

Also, powder X-ray diffraction measurement of the sulfide solid electrolyte particles C1 was carried out as described below. As a result, the sulfide solid electrolyte particles C1 were found to have diffraction peaks at $2\theta=25.7\pm0.5$ (deg), $2\theta=30.2\pm0.5$ (deg) and $2\theta=31.6\pm0.5$ (deg).

Example 1

In the same manner as Comparative Example 1, sulfide solid electrolyte particles C1 were prepared as a sulfide solid electrolyte material.

Next, 100 mg of the sulfide solid electrolyte particles C1 were exposed for 24 hours in an Ar glove box in which the atmosphere had a dew point of −70° C. The exposed sulfide solid electrolyte particles were collected and dried at 100° C. for one hour, thereby producing the sulfide solid electrolyte particles 1 of Example 1. The Li/P molar ratio of the sulfide solid electrolyte particles 1 was 3.8.

The oxygen/sulfur element ratio of the surface of the sulfide solid electrolyte particles 1 and the oxygen/sulfur element ratio at a depth of 30 nm from the particle surface, were obtained by the below-described XPS measurement. The results are shown in Table 1.

Also, powder X-ray diffraction measurement of the sulfide solid electrolyte particles 1 was carried out as described below. As a result, the sulfide solid electrolyte particles 1 were found to have diffraction peaks at $2\theta=25.7\pm0.5$ (deg), $2\theta=30.2\pm0.5$ (deg) and $2\theta=31.6\pm0.5$ (deg).

Example 2

In the same manner as Comparative Example 1, sulfide solid electrolyte particles C1 were prepared as a sulfide solid electrolyte material.

Next, 100 mg of the sulfide solid electrolyte particles C1 were exposed for 24 hours in a dry air glove box in which the atmosphere had a dew point of −50° C. The exposed sulfide solid electrolyte particles were collected and dried at 100° C. for one hour, thereby producing the sulfide solid electrolyte particles 2 of Example 2. The Li/P molar ratio of the sulfide solid electrolyte particles 2 was 3.8.

The oxygen/sulfur element ratio of the surface of the sulfide solid electrolyte particles 2 and the oxygen/sulfur element ratio at a depth of 30 nm from the particle surface, were obtained by the below-described XPS measurement. The results are shown in Table 1.

Also, powder X-ray diffraction measurement of the sulfide solid electrolyte particles 2 was carried out as described below. As a result, the sulfide solid electrolyte particles 2 were found to have diffraction peaks at 2θ=25.7±0.5 (deg), 2θ=30.2±0.5 (deg) and 2θ=31.6±0.5 (deg).

Example 3

In the same manner as Comparative Example 1, sulfide solid electrolyte particles C1 were prepared as a sulfide solid electrolyte material.

Next, 100 mg of the sulfide solid electrolyte particles C1 were exposed for 24 hours in a dry air glove box in which the atmosphere had a dew point of −40° C. The exposed sulfide solid electrolyte particles were collected and dried at 100° C. for one hour, thereby producing the sulfide solid electrolyte particles 3 of Example 3. The Li/P molar ratio of the sulfide solid electrolyte particles 3 was 3.8.

The oxygen/sulfur element ratio of the surface of the sulfide solid electrolyte particles 3 and the oxygen/sulfur element ratio at a depth of 30 nm from the particle surface, were obtained by the below-described XPS measurement. The results are shown in Table 1.

Also, powder X-ray diffraction measurement of the sulfide solid electrolyte particles 3 was carried out as described below. As a result, the sulfide solid electrolyte particles 3 were found to have diffraction peaks at 2θ=25.7±0.5 (deg), 2θ=30.2±0.5 (deg) and 2θ=31.6±0.5 (deg).

Comparative Example 2

In the same manner as Comparative Example 1, sulfide solid electrolyte particles C1 were prepared as a sulfide solid electrolyte material.

Next, 100 mg of the sulfide solid electrolyte particles C1 were exposed for 48 hours in a dry air glove box in which the atmosphere had a dew point of −40° C. The exposed sulfide solid electrolyte particles were collected and dried at 100° C. for one hour, thereby producing the sulfide solid electrolyte particles C2 of Comparative Example 2. The Li/P molar ratio of the sulfide solid electrolyte particles C2 was 3.8.

The oxygen/sulfur element ratio of the surface of the sulfide solid electrolyte particles C2 and the oxygen/sulfur element ratio at a depth of 30 nm from the particle surface, were obtained by the below-described XPS measurement. The results are shown in Table 1.

Also, powder X-ray diffraction measurement of the sulfide solid electrolyte particles C2 was carried out as described below. As a result, the sulfide solid electrolyte particles C2 were found to have diffraction peaks at 2θ=25.7±0.5 (deg), 2θ=30.2±0.5 (deg) and 2θ=31.6±0.5 (deg).

[Evaluation]
(1) Measurement of Oxygen/Sulfur Element Ratio

For the sulfide solid electrolyte particles obtained in each of Examples 1 to 3 and Comparative Examples 1 and 2, the oxygen/sulfur element ratio of the particle surface and the oxygen/sulfur element ratio at a depth of 30 nm (in terms of a $SiO_2$ sputter rate) from the particle surface, were measured by XPS.

The XPS measurement conditions are as follows.
XPS measurement device: "ULVAC-PHI" (manufactured by ULVAC, Inc.)
<XPS Measurement Conditions>
Measurement light source: Al (monochromator)
Analysis area: 200 μm φ
Pass energy: 187 eV (wide scan) and 46 eV (narrow scan)
Energy step: 0.8 eV (wide scan) and 0.1 eV (narrow scan)
<Sputtering Conditions>
Accelerating voltage and current: 3.0 kV and 20 mA
AMPL: (3 mm×3 mm)
Sputter rate: 3.9 nm/min (in terms of $SiO_2$)
Etching was carried out to obtain the distribution of each element in the depth direction. Based on the thus-obtained distribution data, the O/S element ratio of the outermost surface and the O/S element ratio at a depth of 30 nm were obtained. The depth of 30 nm was calculated from the sputter rate of 3.9 nm/min (in terms of $SiO_2$).

(2) X-Ray Crystal Diffraction Measurement

For the sulfide solid electrolyte particles obtained in each of Examples 1 to 3 and Comparative Examples 1 and 2, the XRD spectrum was obtained by powder X-ray diffractometry using CuKα radiation. In this measurement, a powder X-ray diffractometer ("RINT-ULTIMA III" manufacture by Rigaku Corporation) was used. The measurement was carried out at a scan rate of 1°/min and a diffraction angle in a range of from 10° to 40° (2θ=10° to 40°).

(3) Ion Conductivity

First, 100 mg of the sulfide solid electrolyte particles of each of Examples 1 to 3 and Comparative Examples 1 and 2, were prepared and subjected to preliminary pressing at a pressure of 7 MPa by use of a pellet forming machine, thereby producing a solid electrolyte pellet. Next, a carbon coat foil having a thickness of 21 μm was disposed on both surfaces of the solid electrolyte pellet. The solid electrolyte pellet sandwiched by the carbon coat foils, was further sandwiched by stainless-steel (SUS) pins. In this state, the resulting stack was subjected to cold pressing at a pressure of 40 MPa, which was main pressing, and then bolted at a torque of 6 N, thereby obtaining an ion conductivity measurement cell.

The ion conductivity measurement cell was installed in an AC impedance measurement device ("SOLATRON 1260" manufactured by Solartron Analytical). AC impedance measurement (25° C.) of the cell was carried out in the following conditions to obtain the resistance of the cell.

Applied voltage: 10 mV
Measured frequency range: 0.01 MHz to 1 MHz
The ion conductivity of Example 1 was calculated from the resistance obtained by the AC impedance measurement and the thickness of the pellet.

(4) Measurement of Generated Hydrogen Sulfide Amount

A 1.5 L desiccator was placed in a dry air glove box in which the atmosphere had a dew point of −40° C. Next, 100 mg of the sulfide solid electrolyte particles of each of Examples 1 to 3 and Comparative Examples 1 and 2, and a hydrogen sulfide sensor were placed therein, and hydrogen sulfide generation behavior was measured. From a hydrogen sulfide concentration after the exposure of 30 minutes and the mass of the sulfide solid electrolyte particles after the exposure of 30 minutes, the generated hydrogen sulfide amount per unit mass (ml/g).

[Results]

The following Table 1 shows a comparison between Examples 1 to 3 and Comparative Examples 1 and 2 in the exposure conditions for exposing the surface of the sulfide solid electrolyte particles to water, along with the oxygen/sulfur element ratio of the surface of the sulfide solid electrolyte particles and the oxygen/sulfur element ratio at a depth of 30 nm (in terms of a $SiO_2$ sputter rate) from the particle surface.

The following Table 2 shows a comparison between Examples 1 to 3 and Comparative Examples 1 and 2 in the oxygen/sulfur element ratio of the surface of the sulfide solid electrolyte particles and the oxygen/sulfur element ratio at a depth of 30 nm (in terms of a $SiO_2$ sputter rate) from the particle surface, along with ion conductivity and generated hydrogen sulfide amount.

TABLE 1

| | Exposure atmosphere dew point | Exposure time | Environment water amount (ppm·h) | O/S ratio (X) of outermost surface | O/S ratio (Y) at a depth of 30 nm |
|---|---|---|---|---|---|
| Comparative Example 1 | — | — | 0 | 0.24 | 0.12 |
| Example 1 | −70° C. (2 ppm) | 24 h | 48 | 0.29 | 0.11 |
| Example 2 | −50° C. (39 ppm) | 24 h | 936 | 0.67 | 0.16 |
| Example 3 | −40° C. (127 ppm) | 24 h | 3048 | 0.81 | 0.29 |
| Comparative Example 2 | −40° C. (127 ppm) | 48 h | 6096 | 1.74 | 0.44 |

TABLE 2

| | O/S ratio (X) of outermost surface | O/S ratio (Y) at a depth of 30 nm | Ion conductivity (mS/cm) | Generated hydrogen sulfide amount (ml/g) |
|---|---|---|---|---|
| Comparative Example 1 | 0.24 | 0.12 | 4.4 | 1.53 |
| Example 1 | 0.29 | 0.11 | 4.5 | 1.27 |
| Example 2 | 0.67 | 0.16 | 5.0 | 1.24 |
| Example 3 | 0.81 | 0.29 | 3.2 | 0.50 |
| Comparative Example 2 | 1.74 | 0.44 | 0.2 | 0.19 |

In Comparative Example 1, as described above, the sulfide solid electrolyte particles wherein the particles were not exposed to a predetermined water concentration atmosphere for a predetermined time and the oxygen/sulfur element ratio of the particle surface was smaller than the oxygen/sulfur element ratio specified in the disclosed embodiments, were used. For Comparative Example 1, as shown in Table 2, the generated hydrogen sulfide amount was large, and the effect of suppressing hydrogen sulfide generation was insufficient. In Comparative Example 2, as described above, the sulfide solid electrolyte particles wherein the oxygen/sulfur element ratio of the particle surface and the oxygen/sulfur element ratio at a depth of 30 nm from the particle surface were larger than the oxygen/sulfur element ratio specified in the disclosed embodiments, were used. For Comparative Example 2, the ion conductivity was very low.

In Examples 1 to 3, as described above, the sulfide solid electrolyte particles comprising Li, P, S and a halogen as constituent elements and having a Li/P molar ratio of more than 3, were used, wherein the oxygen/sulfur element ratio of the particle surface measured by XPS is 0.29 or more and 0.81 and less, and the oxygen/sulfur element ratio at a depth of 30 nm (in terms of a $SiO_2$ sputter rate) from the particle surface measured by XPS, is 0.29 or less. Examples 1 to 3 were proved to suppress a decrease in ion conductivity and have sufficient ion conductivity.

Accordingly, by using the sulfide solid electrolyte particles of Examples 1 to 3 in an all-solid-state battery, ion conductivity is increased, and hydrogen sulfide generation is suppressed.

REFERENCE SIGNS LIST

1. Sulfide solid electrolyte particle
2. Oxide layer
3. Sulfide solid electrolyte material
11. Cathode layer
12. Anode layer
13. Solid electrolyte layer
20. Cathode active material
100. Power generation element

The invention claimed is:

1. Sulfide solid electrolyte particles comprising Li, P, S and a halogen as constituent elements and having a Li/P molar ratio of more than 3,
   wherein an oxygen/sulfur element ratio of the particle surface measured by XPS is 0.29 or more and 0.81 and less, and an oxygen/sulfur element ratio at a depth of 30 nm (in terms of a $SiO_2$ sputter rate) from the particle surface measured by XPS, is 0.29 or less.

2. The sulfide solid electrolyte particles according to claim 1, wherein the sulfide solid electrolyte particles have diffraction peaks at 2θ=25.7±0.5 (deg), 2θ=30.2±0.5 (deg) and 2θ=31.6±0.5 (deg) in powder X-ray diffractometry using CuKα radiation.

3. A method for producing the sulfide solid electrolyte particles defined by claim 1, the method comprising:
   preparing a sulfide solid electrolyte material,
   exposing the sulfide solid electrolyte material to a predetermined water concentration atmosphere for a predetermined time to ensure that the oxygen/sulfur element ratio of the particle surface measured by XPS, is 0.29 or more and 0.81 and less, and the oxygen/sulfur element ratio at a depth of 30 nm (in terms of a $SiO_2$ sputter rate) from the particle surface measured by XPS, is 0.29 or less, and
   drying the exposed sulfide solid electrolyte material.

4. The method for producing the sulfide solid electrolyte particles according to claim 3, the method comprising exposing the sulfide solid electrolyte material to an environment water amount of 3048 ppm·h or less, which is an environment water amount (ppm·h) represented by a product of a water concentration (ppm) of an exposure atmosphere dew point and an exposure time (h), and drying the exposed sulfide solid electrolyte material.

5. An all-solid-state battery comprising a cathode layer, an anode layer and a solid electrolyte layer disposed between the cathode layer and the anode layer, wherein at least one of the cathode layer, the anode layer and the solid electrolyte layer comprises the sulfide solid electrolyte particles defined by claim 1.

* * * * *